Aug. 30, 1955          H. V. AYRES          2,716,525
AUTOMATIC TEMPERATURE CONTROL FOR BURNERS
Filed April 16, 1951          2 Sheets-Sheet 1
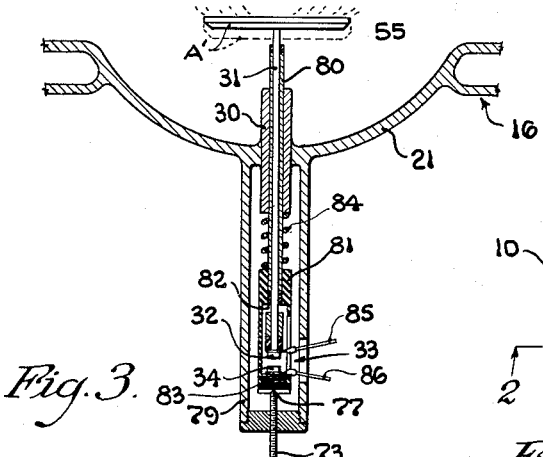
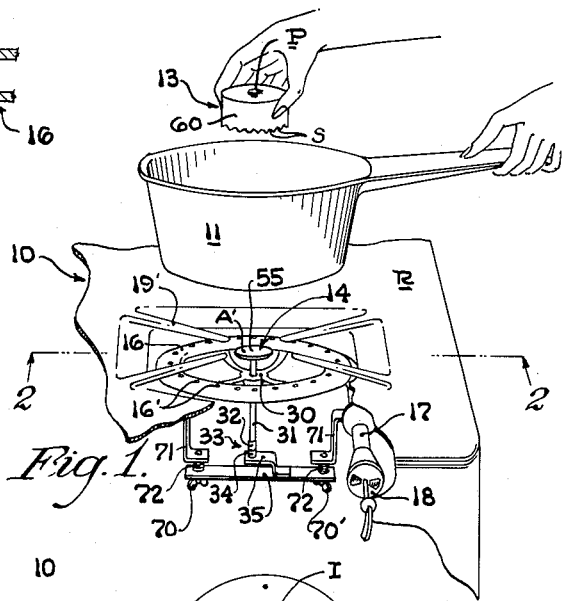
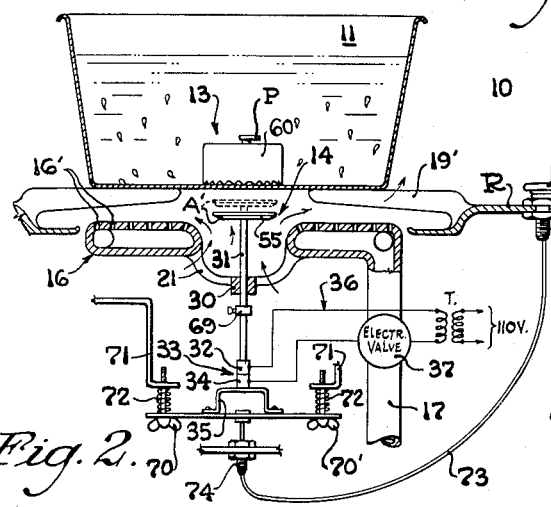
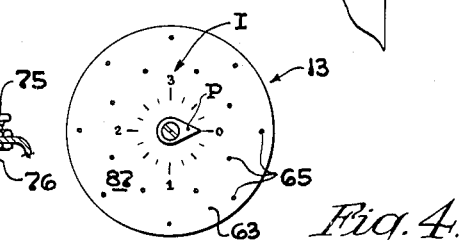
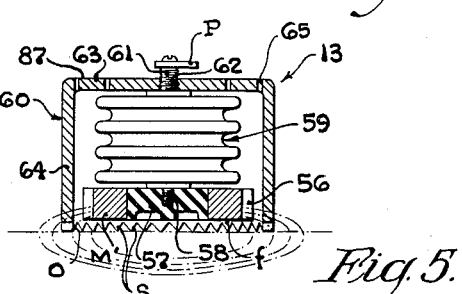
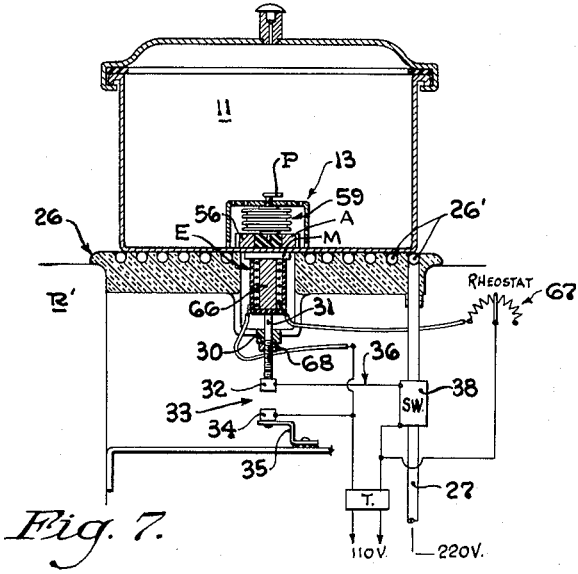
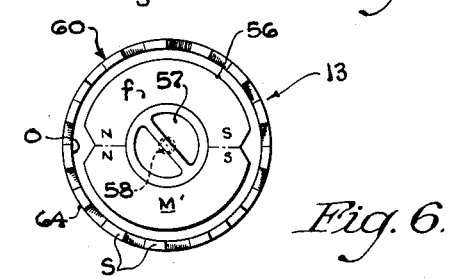
INVENTOR.
Harlow V. Ayres
BY
Leslie M. Hansen
HIS ATTORNEY.

2,716,525

AUTOMATIC TEMPERATURE CONTROL FOR BURNERS

Harlow V. Ayres, San Jose, Calif.

Application April 16, 1951, Serial No. 221,307

8 Claims. (Cl. 236—20)

This invention relates to an automatic control for burners, hot plates and the like and more particularly to magnetically operable mechanism cooperative with a mobile heat responsive means for controlling the temperature at the burner or hot plate.

This invention further contemplates the provision of a magnetically operable fuel control in which compensation for vessel wall thicknesses can be afforded. A further object along this line is the provision in such type controls of means for regulating the sensitivity of the magnetically operable portion thereof for attaining variability in range of temperature within the vessel employed therewith.

Another object of this invention is to provide an automatic control for burners which is simple in construction and operation, simple to manufacture and highly efficient in use.

Other objects and advantages of the present invention will become apparent in the following description when read in the light of the drawings in which:

Fig. 1 is a perspective view of a gas burning range having a simplified form of the present invention installed therein.

Fig. 2 is a fragmentary section through the burner shown in Fig. 1 with certain portions of the present invention schematically illustrated.

Fig. 3 is an enlarged fragmentary section through a portion of the control mechanism shown in Figs. 1 and 2 slightly modified.

Fig. 4 is a top plan view of a heat responsive unit as shown in Figs. 1 and 2.

Fig. 5 is a diametrical section of the unit shown in Fig. 4.

Fig. 6 is a bottom view of the unit shown in Figs. 4 and 5.

Fig. 7 is the arrangement similar to that of Fig. 2 modified for use with the hot plate of an electric range.

Figure 8:
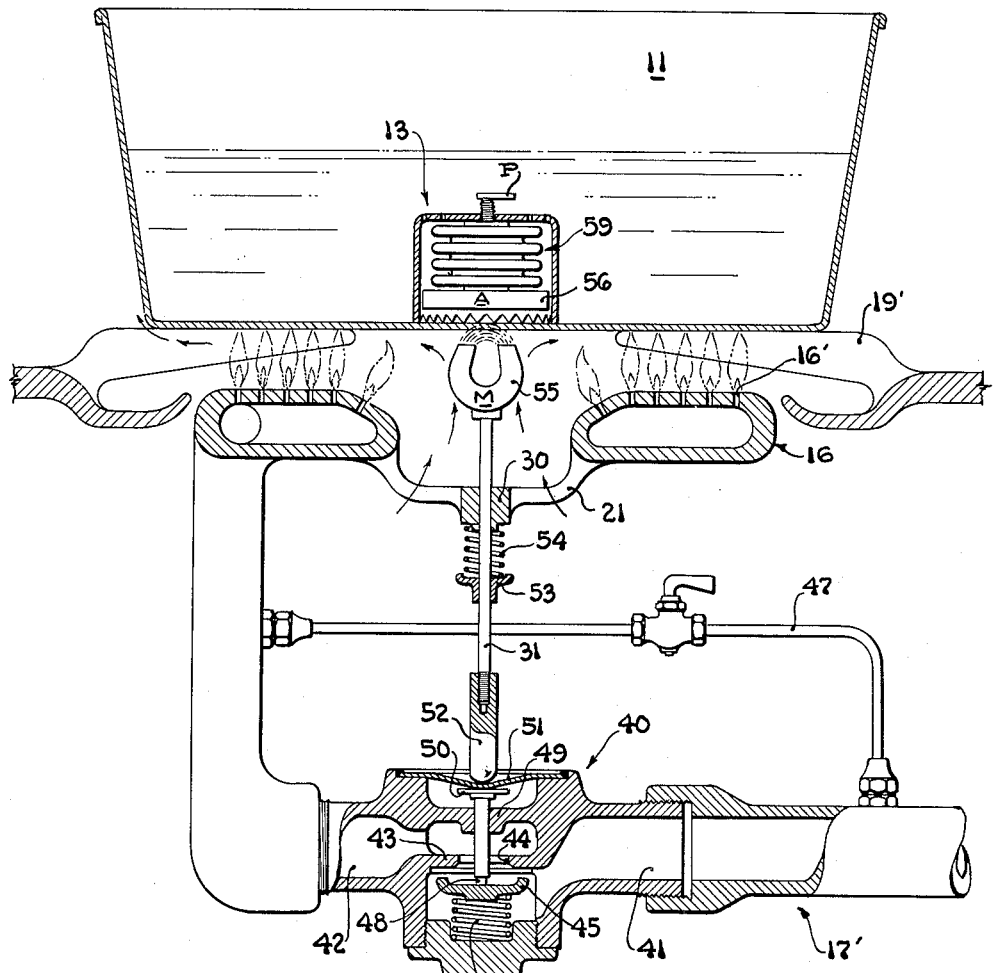
Fig. 8 is an enlarged section similar to that of Fig. 2 showing a direct control of the fuel supply of the burner.

Referring now to the drawings, the present invention is shown associated with a conventional source of heat 10 having a vessel 11 made of non-magnetic material supported over it for purposes of cooking and the like. The invention 12 generally stated comprises an independent mobile heat responsive element 13 adapted to be manually deposited in the vessel 11 for cooperation with a magnetically operated mechanism 14 for regulating the supply of fuel to the source of heat.

The source of heat 10 may be a gas burner 16 having a fuel supply conduit 17 communicating therewith and with a hand controlled valve 18, Fig. 1, from a main gas line, not shown, in a range R. If the present invention is to be used in an electric range R' (see Fig. 7) the source of heat is generally a hot plate 26 having a coiled heating element 26' therein connected to a fuel supply line in the form of an electric wire or conductor 27 in turn connected to a 220 volt source of power through a hand operated switch not shown.

In the case of the hot plate 26 (Fig. 7) the vessel 11 rests directly upon the coiled heating elements 26' whereas in the case of the gas burner 16 (Figs. 1 and 2) the vessel 11 is supported on a grate 19' sufficiently above the burner 16 to allow for the flame resulting from the ignition of the fuel gas as it discharges through the apertures 16' in the burner.

In either of the foregoing situations the source of heat is provided with a guide sleeve 30 which is preferably disposed coaxial with respect to the burner or hot plate. This guide sleeve 30 is supported within the gas or electric range and is preferably, although not necessarily, suspended from the burner or hot plate by radial arms 21, Figs. 1, 2, 3, 7 and 8.

The magnetically operated mechanism 14 includes a rod 31 arranged in the guide sleeve 30 for axial movement with respect thereto. The rod 31 is normally urged downwardly by gravity as illustrated in Figs. 2, 3 and 7. In this general embodiment the lower end of the rod 31 carries one contact point 32 of a switch 33 having its other contact point 34 disposed on a bracket 35. This switch 33 is embodied in a circuit 36 for controlling the flow of electric current to a cutoff or gate means in the form of a regulator comprising an electrically operated valve 37 in the fuel supply conduit 17 in Fig. 2 or an electric relay switch 38 interposed in the supply line 27 of the electric range R' shown in Fig. 7. In either of the foregoing installations, Figs. 2 and 7, the two contact points 32—34 normally engage each other to complete the circuit 36 to the gate means, i. e., regulator valve 37 or switch 38 so that fuel, in the form of gas or electric current, will flow into the source of heat 10, i. e., burner 16 or hot plate 26 as the case may be. In this connection it will be apparent that the normal hand control for turning on the burner or hot plate has been manipulated in the usual manner.

In place of the contact point feature just explained it will be apparent that the same result can be attained mechanically as seen for example in Fig. 8. In this installation, Fig. 8, the fuel supply conduit 17' also has a gate means in the form of a regulator valve 40. This valve 40 may be of conventional design including an inlet 41 and an outlet 42 separated by a baffle 43 having a valve passage 44 formed therethrough in axial alignment with the guide sleeve 30 and rod 31. A closure cap 45 is disposed in the inlet 41 on a compression spring 46 which presses the cap 45 against the baffle 43 to close the passage 44 to thereby shut off the gas. However, a by-pass line 47 is provided to supply just enough fuel to the burner 16 to keep a low (minimum) flame at the apertures 16' of the burner.

A center pin 48 is guided by sleeve 49 for axial movement with respect to the cap 45 and rod 31. The spring 46 normally urges the cap 45 into closed position and raises the pin 48 so that its upper end 50 presses upwardly on a flexible sealing diaphragm 51. The lower end of the rod 31 in this installation carries an adjustable foot 52 which bears down against the diaphragm 51 in alignment with the pin 48. Moreover, in this installation the rod carries a collar 53 forming a seat for a compression spring 54 encircling the rod and having its upper end in engagement with the guide sleeve 30. The spring 54 is of such strength as to overcome the spring 46 to normally maintain the cap 45 in its lowermost, fully open position with respect to the passage 44. From the foregoing it will be apparent that either fuel gas or electric energy is constantly supplied to the burner or hot plate, as the case may be, upon opening of a hand controlled valve or switch in the conventional manner. In other words, the regulator valve or switch acts as a gate means which is constantly open to allow gas or electricity to flow through the fuel supply line to the burner or hot plate. However, in accordance with the present invention when the contents of a vessel supported over the source of heat reaches a predetermined temperature the magnetically operated mechanism 14 is affected by the temperature responsive element, in a manner now to be explained, to cut off the flow of fuel through the gate means.

In either of the foregoing installations, Figs. 2, 7 or 8, the upper end of the rod carries a magnetic element 55 adapted to be influenced by another magnetic element 56 embodied in the heat responsive element 13 which is disposed in the vessel 11. It should here be understood that one of the above mentioned magnetic elements consists of a magnet M while the other of such elements consists of a ferrous metal plate A which is attractable by the magnet M. Moreover, it should now be apparent that either element 55 or 56 may be magnetized in which case the opposing element need only be magnetically attractable.

Referring now to Figs. 1 through 6 inclusive, the element 55 on the upper end of the rod 31 consists of a disc A' of magnetically attractable material. The element 56, as best seen in Figs. 5 and 6, comprises a permanent magnet M' in the form of a ring sweat onto a mounting plug 57 threadedly secured to a stud 58 on a temperature sensitive means in the form of a bellows 59. The bellows, plug and magnet are housed within a cuplike cover 60 of the heat responsive element 13 hereinbefore referred to. The upper end of the bellows 59 has a stud screw 61 threaded through a tapped bore 62 in the base wall 63 of the cover 60.

When the bellows is collapsed, i. e., cold, it draws the element 56 into the cuplike cover so that the lower face $f$ of the element 56 is well inside the open end O of the peripheral wall 64 of cover 60, preferably about ⅛ of an inch. It will be noted that the edge of the peripheral wall 64 around the opening O is serrated as at S and that the base wall 63 of the cover is perforated as at 65 to influence circulation of fluid upwardly and around the bellows 59.

The temperature responsive element 13 is placed in the vessel 11 with the serrated edge S of the cover 60 resting on the bottom of the vessel. With the bellows 59 contracted, the magnet M' is maintained high enough in the cover 60 so that its field currents have no effect on the magnetically attractable disc A' on the rod 31. However, when the bellows 59 expands, the element 56 is shifted closer toward the bottom of the pan or vessel 11 whereby the field currents of the magnet M' will influence the magnetically attractable disc A' on the upper end of the rod 31. The rod 31 is thus lifted, for example into the dotted line position Fig. 2, to separate contact points 32—34 in the fuel supply control circuit 36. In this manner the flow of fuel to the burner 16 is cut down so that the temperature of the fluid in the vessel 11 will tend to decrease.

The same result is attained in the installation shown in Fig. 8 wherein it will be noted that the attraction of the rod 31 upward effects closing of the cap 45 over the passage 44 to shut off the flow of fuel from the inlet 41 to the outlet 42 side of the regulator valve 40. In this connection it should also be noted that the magnet M is the element 55 secured to the upper end of the rod 31 whereas the magnetically attractable disc A is secured to the bottom stud on the bellows 59.

Fig. 7, in addition to showing an installation for electric ranges, also illustrates a form of electro-magnet E disposed in the position of the element 55 on top of the rod 31. In this form of element 55 the cap of a core 66 is the magnet M, the core 66 being surrounded by a wire coil suitably covered and having a rheostat control 67 for strengthening or weakening the magnetic field current created in the electromagnet E. In this manner the magnet M can be conditioned to lift the rod 31 as greater or lesser temperature is attained within the vessel 11. It should also be noted that upward movement of the rod 31 under the influence of magnetic field currents is limited by a stop collar 68 threadedly mounted on the rod 31 for engaging the lower end of the guide sleeve 30.

A similar collar 69 is disposed on the rod 31 of the installation shown in Fig. 2. However, in this case the sensitivity of the rod 31 to elevation under the influence of the magnetic field currents can be altered and/or varied by raising or lowering the bracket 35 which supports the lower contact point 34 of the switch 33. This may be necessary upon an initial installation to suit the present device for operation with a vessel having a specific bottom thickness, it being apparent that each installation may require a different setting to suit the vessels to be used.

As shown in Figs. 1 and 2 the bracket 35 is mounted on wing bolts 70 and 70' each suspended from a stationary ledge or support 71 within the gas range body R. A spring 72 encircles each bolt 70 and 70' between the ledge 71 and the bracket 35 to maintain the bracket 35 away from the ledge 71. However, by turning the wing bolts 70—70' the bracket 35 can be moved closer to the ledge 71 to raise the rod 31 and its element 55 toward the zone of the field currents of the magnet M in the element 56.

In lieu of the wing bolts 70—70' a flexible cable or Bowden wire 73 may be employed to lift the rod 31 of the magnetically operated mechanism 14. One end of this wire 73 is secured to the movable bracket 35 adjacent a guide sleeve 74, the opposite end of wire 73 having a knob 75 disposed in a guide tube 76 extending through one wall of the range R. It should here be noted that the knob 75 can be threadedly connected to the guide tube 76 for advancing the wire 73 in uniform and graduated degrees dependent upon the lead pitch of the threading on the knob.

In connection with the foregoing it will be seen in Fig. 3 that the Bowden wire 73 can be threaded at its inner end 77 for threaded advancing or withdrawal with respect to the bottom of a fixed shell 79 suspended from the radial arms 21 provided on the burner 16. This shell 79 forms a closure for the contact points 32—34 to prevent corrosion and clogging thereof. The shell 79 is coaxial with the guide sleeve 30 which has a tube 80 arranged therein for up and down movement with the rod 31 slidingly supported therein. The lower end of this tube 80 carries a barrel 81 made of non conductive material such as Bakelite. The barrel 81 is suspended from the tube 80 to provide an open chamber 82 at the lower end thereof into which the lower end and contact point 32 of the rod 31 extends. The lower open end of the barrel 81 is closed by an insulated plug 83 bearing on its upper end the other contact point 34 of switch 33 and having its lower end disposed for engagement by the threaded inner end 77 of the flexible cable or Bowden wire 73. A compression spring 84 encircles the tube 80 between the guide sleeve 30 and the upper end of the barrel 81 to constantly urge the latter downward against the threaded end 77 of the hand controlled cable 73. Both the barrel 81 and the shell 79 have suitable openings in their side walls through which flexible lead wires 85 and 86, connected to contact points 32 and 34 respectively, extend for connection with the circuit 36 hereinbefore referred to.

The means for varying the sensitivity of the magnet M relative to the magnetically attractable element A carried by the heat responsive element 13 in Fig. 8 comprises the threaded connection between the foot 52 and the rod 31. By turning the foot 52 relative to the rod 31 the latter is lengthened or shortened as desired to change the spacing of the element 55, magnet M, at its upper end relative to the bottom of the vessel 11.

The heat responsive element 13, Figs. 4, 5, and 6, is provided with a temperature guage in the form of indicia I on its top surface 87 Fig. 4 cooperating with a pointer P for setting the bellows 59 to effect magnetic attraction of the element 55 on rod 31 within a certain range of temperature. In this connection it will be noted that when the pointer P is turned clockwise relative to the indicia I on the top surface 87 of the base wall 63 of cover 60, the mounting screw 61 advances upwardly relative to the base wall 63 of the cover.

In this manner the bellows 59 and element 56 carried thereby is raised so as to influence element 55 by the magnetic field currents only after greater expansion of the bellows. In other words when the element 56 is thus raised it will be necessary that the contents of the vessel 11 be increased to a temperature of predetermined or higher degree in order to expand the bellows sufficiently to lower element 56 into a position to influence element by magnetic field currents. However, by turning the pointer in an opposite direction the stud screw 61 lowers the bellows element assembly so that the element 55 will be influenced by the magnetic field currents when a lower temperature is attained within the vessel 11.

Briefly summarizing the operation of the present apparatus it will be assumed that the magnetically operated mechanism 14 is set to operate within a desired temperature range, the source of heat 10 being turned on and the vessel 11 placed over it with whatever fluid is to be cooked in the vessel. The temperature responsive unit or element 13, being an independent unit and mobile, can be held in one hand while its pointer P is at the desired indicia I and placed in the vessel.

When the fluid in the vessel begins to cook the unit 13 being mobile will jiggle or dance a little and center itself over the element 55 on the rod 31 due to the influence of the magnetic field currents emanating from the element 56 in unit 13. These field currents, alone, are not strong enough to lift the element 55 and rod 31 until the bellows 59 has expanded sufficiently, dependent on the temperature of the fluid in the vessel 11. Consequently, only after expansion of the bellows will the element 56 be lowered sufficiently to dispose the zone of the field currents of magnet M around the element 55 whereupon the rod 31 will be lifted to separate contact points 32—34 Figs. 2, 3 and 7 or to counteract the compression of spring 54 in Fig. 8. As a result of the foregoing the supply of fuel to the burner 16 or hot plate 26, as the case may be, will be dampened, lowered, or completely cut off to stop further heating of the contents in the vessel 11.

As illustrated in Fig. 8, the by-pass line 47, which can be employed in the installation shown in Fig. 2, admits sufficient fuel to maintain a pilot light at the apertures 16' of the burner 16. Consequently, after a predetermined drop in temperature in the contents of the vessel 11 and corresponding contraction of the bellows 59 to raise the element 56 and its field currents away from element 55, the latter is released allowing the rod 31 to drop by gravity (Figs. 2, 3) or under the influence of the spring 54 in Fig. 8 to again admit fuel through the respective control valves 37 or 40. The same result is attained in the electric range R' Fig. 7 merely by exciting or turning off the relay switch 37 to control the flow of electrical current via supply line 27 to the coiled heating element 26'.

From the foregoing it will be apparent that the present invention provides an automatic burner control for maintaining the contents of a vessel within a desired temperature range without fear of over cooking or burning the contents of the vessel. This is important in connection with certain substances such as sugar, milk, cream and the like which notoriously burn if the temperature thereof rises beyond predetermined limits. It is also important to note that the range of temperature control with the present invention is variable to suit any specific need, and that the device of the present invention is adapted, after initially set, to compensate for the thickness of the bottom of a vessel to be used. Moreover, suitable regulation of the sensitivity of the magnet M relative to the attractable element A is afforded as for example by manipulation of the Bowden wire or cable 73, Fig. 2, or the rheostat control 67, Fig. 7.

While the present invention has been described and disclosed herein in specific detail it will be apparent to those skilled in the art that various modifications and alterations can be made without departing from the spirit of my invention. I therefore desire to avail myself of all variations, modifications and alterations as fairly come within the purview of the appended claims.

What I claim as new and desire to protect by Letters Patent is:

1. The combination with a source of heat communicated with a fuel supply line and having a non-magnetic cooking vessel supported thereover for purposes of cooking the contents of said vessel; of a device for automatically maintaining the temperature of said contents within a predetermined range comprising a gate means in said fuel supply line for normally cutting off the supply of fuel therethrough, a magnetically operated mechanism arranged exteriorly of and spaced from said vessel for reciprocation toward and from said vessel, means normally urging said magnetically operated mechanism away from said vessel, means for operatively connecting said magnetically operated mechanism with said gate means for opening said gate means to admit fuel to said source of heat via said fuel supply line when said magnetically operated mechanism is urged away from said vessel, and independent mobile means adapted to be manually deposited in the contents of said vessel, said independent mobile means including a temperature responsive element having contact with fluid in said vessel, means for supporting said temperature responsive element relative to the bottom wall of said vessel in axial alignment with the path of reciprocations of said magnetically operated mechanism exteriorly of said vessel, and a magnetic element carried by said temperature responsive element for movement therewith toward and from said bottom wall of said vessel into and out of a position to influence and attract said magnetically operated mechanism exteriorly of said vessel toward said vessel.

2. The combination with a source of heat having a fuel supply line associated therewith and a non-magnetic cooking vessel supported thereover for purposes of cooking the contents of said vessel; of an automatic control device comprising a shut-off means in said fuel supply line normally open to admit fuel therethrough to said source of heat, a magnetically operated mechanism arranged for reciprocation relative to said source of heat toward and from said vessel, means for operatively connecting said magnetically operated mechanism with said shut-off means for affecting the latter when said magnetically operated mechanism is attracted toward said vessel for shutting off the supply of fuel via said fuel supply line, and an independent mobile heat responsive element placed in said vessel including a temperature responsive element adapted to be in contact with fluid contained within said vessel, variable means for supporting said temperature responsive element a preselected distance above the bottom wall of said vessel for movement toward and from the latter dependent upon expansion and contraction of said temperature responsive element according to the temperature of the fluid in said vessel, and a magnet carried by said temperature responsive element for movement therewith so that the zone of the field currents emanating from said magnet is moved into a position to influence and attract said magnetically operated mechanism toward said vessel.

3. In a cooking appliance of the type including a source of heat communicating with a fuel supply line and having a non-magnetic vessel supported thereover for subjecting the contents of said vessel to the heat created by said source of heat; the combination therewith of an automatic temperature control comprising a fuel regulator disposed in said fuel supply line for normally cutting off the supply of fuel to said source of heat, a rod reciprocable axially toward and from said vessel, means connecting said rod to said fuel regulator, means for normally urging said rod away from said vessel into a position for operating said fuel regulator to admit fuel through said fuel supply line to said source of heat, a magnetic element mounted on the end of said rod exteriorly of and facing said vessel, said vessel having fluid therein, and an independent mobile unit adapted to be manually submerged in the fluid in said vessel in substantial alignment with the path of reciprocation of said rod, said mobile unit comprising a housing, a temperature responsive element within said housing and in contact with the fluid in said vessel, means for suspending said temperature responsive element within said housing with the lower end of said temperature responsive element in a zone for movement toward and from the bottom wall of said vessel, a magnet element carried by said temperature responsive element for movement therewith toward and from said magnetic element dependent upon the temperature of the fluid in said vessel to thereby attract said magnetic element and said rod toward said vessel when the fluid in said vessel attains a predetermined temperature, and means for presetting the disposition of said temperature responsive element relative to said housing for moving said magnetic element into a position in which its magnetic field currents arrive at said zone in which they effect attraction of said magnetic element other than said predetermined temperature of the fluid in said vessel.

4. In a cooking appliance of the type including a source of heat communicating with a fuel supply line and having a non-magnetic vessel supported thereover for subjecting the fluid contents of said vessel to the heat created by said source of heat; the combination therewith of an automatic temperature control comprising a fuel regulator disposed in said fuel supply line and having a spring urged valve for normally cutting off the supply of fuel to said source of heat and adapted when operated to admit fuel to said source of heat, a rod reciprocable axially toward and from said vessel, means supporting said rod for reciprocation between predetermined limits between the bottom of said vessel and said regulating means, means for normally urging said rod away from said vessel into contact with said fuel regulator for counteracting said spring urged valve thereof to thereby open the latter to admit fuel to said source of heat, a magnetic element mounted on the end of said rod facing said vessel, an independent mobile temperature responsive element disposed in said vessel in contact with the fluid therein, means for supporting said temperature responsive element in said vessel in axial alignment with the path of reciprocation of said rod, a magnet element carried by said temperature responsive element for movement therewith toward and from said magnetic element dependent upon the temperature of the fluid in said vessel to thereby attract said magnetic element and said rod toward said vessel when the fluid in said vessel attains a predetermined temperature and to release said magnetic element from the influence of said magnet when the temperature of the fluid in said vessel drops below said predetermined temperature, and means for regulating the sensitivity of said magnet and said magnetic element relative to each other comprising a hand control operatively connected to said means for supporting said rod for moving the latter into a position in which the magnetic element on said rod is closer to or farther from said vessel.

5. In a cooking appliance of the type including a source of heat communicating with a fuel supply line and means for supporting a fluid containing vessel of non-magnetic material thereover for subjecting the contents of said vessel to the heat created at said source of heat; the combination with a magnetically operated regulator interposed in said fuel supply line of an independent mobile temperature responsive unit for operating the latter comprising a cup-like housing adapted to be submerged in the fluid contained in said vessel, said housing having its open bottom resting on the bottom of said vessel and its opposite base wall supported above the bottom wall of said vessel, a temperature responsive element supported from the base wall of said housing for movement away from the bottom wall of said vessel when the fluid contained therein drops below a predetermined temperature, said temperature responsive element being adapted to move toward said bottom wall of said vessel when the fluid therein rises to said predetermined temperature, magnetic means secured to the lower end of said temperature responsive element for movement therewith into and out of a zone in which the field currents of said magnetic means effect operation of said magnetically operated regulator to close said regulator when the fluid in said vessel attains said predetermined temperature, and to open said regulator when the fluid drops below said predetermined temperature.

6. In a cooking appliance of the type including a source of heat communicating with a fuel supply line and means for supporting a fluid containing vessel of non-magnetic material thereover for subjecting the contents of said vessel to the heat created at said source of heat; the combination with a magnetically operated regulator interposed in said fuel supply line of an independent mobile temperature responsive unit for operating the latter comprising a cup-like housing adapted to be submerged in the fluid contained in said vessel, said housing having its open bottom resting on the bottom of said vessel and its opposite base wall supported above the bottom wall of said vessel, a temperature responsive element, means for suspending said temperature responsive element from the base wall of said housing for movement away from the bottom wall of said vessel when the fluid contained therein drops below a predetermined temperature, said temperature responsive element being adapted to move toward said bottom wall of said vessel when the fluid therein rises to said predetermined temperature, magnetic means secured to the lower end of said temperature responsive element for movement therewith into and out of a zone in which the field currents of said magnetic means effect operation of said magnetically operated regulator to close said regulator when the fluid in said vessel attains said predetermined temperature and to open said regulator when the fluid drops below said predetermined temperature, and means associated with said means for suspending said temperature responsive element for presetting the disposition of said temperature responsive element relative to said housing for moving said magnetic element into a position in which its magnetic field currents arrive at said zone in which they effect operation of said magnetically operated regulator at a temperature other than said predetermined temperature of the contents of said vessel.

7. In a cooking appliance including a source of heat communicating with a fuel supply line and means for supporting a non-magnetic vessel containing fluid over said source of heat, the combination with a regulator in said fuel supply line and operatively associated with a magnetically attractable means mounted in said appliance below and for movement toward and from the bottom wall of said vessel, of an independent mobile temperature responsive unit comprising an inverted cup-like container having its open bottom resting on the bottom wall of said vessel and within the fluid contained in said vessel, said cup-like container having a perforated base wall opposite its open end, a temperature responsive bellows having one end thereof secured to the base wall of said cup-like container for suspension therefrom within the side wall of said container, a magnetic element secured to the opposite end of said bellows within said vessel for movement by said bellows toward and from the bottom wall of said vessel to shift the field currents of said magnet element into and out of a zone in which they are effective or ineffective to respectively attract or release the magnetically attractable means to thereby cut off or admit the flow of fuel from said fuel supply line to said source of heat.

8. In a cooking appliance including a source of heat communicating with a fuel supply line and means for supporting a non-magnetic vessel containing fluid over said source of heat, the combination with a regulator in said fuel supply line and operatively associated with a magnetically attractable means mounted in said appliance below and for movement toward and from the bottom wall of said vessel, of an independent mobile temperature responsive unit comprising an inverted cup-like container having its open bottom resting on the bottom wall of said vessel and within the fluid contained in said vessel, said cup-like container having a perforated base wall opposite its open end, a temperature responsive bellows having one end thereof secured to the base wall of said cup-like container for suspension therefrom within the side wall of said container, a magnet element secured to the opposite end of said bellows for movement thereby toward and from the bottom wall of said vessel to shift the field currents of said magnet element into and out of a zone in which are effective or ineffective to respectively attract or release the magnetically attractable means to thereby cut off or admit the flow of fuel from said fuel supply line to said source of heat, said cup-like container having serrations formed in that edge of its side walls resting on the bottom wall of said vessel for inducing circulation of fluid contained in said vessel past said bellows.

References Cited in the file of this patent

UNITED STATES PATENTS

| | | |
|---|---|---|
| 947,914 | Junkers | Feb. 1, 1910 |
| 1,201,469 | James | Oct. 17, 1916 |
| 1,479,083 | Morris | Jan. 1, 1924 |
| 1,692,153 | Botts | Nov. 20, 1928 |
| 1,729,060 | Breese, Jr. | Sept. 24, 1929 |
| 2,199,974 | Whitney | May 7, 1940 |
| 2,339,087 | Mantz | Jan. 11, 1944 |
| 2,402,715 | Grayson | July 2, 1946 |
| 2,424,161 | Gunther | July 15, 1947 |
| 2,430,715 | Grayson | Nov. 11, 1947 |